April 3, 1951     A. N. GRAY     2,547,000
APPARATUS FOR SIMULTANEOUSLY ADVANCING
AND PLASTICIZING PLASTIC COMPOUNDS Filed April 7, 1949     4 Sheets-Sheet 1

INVENTOR
A. N. GRAY
BY
ATTORNEY

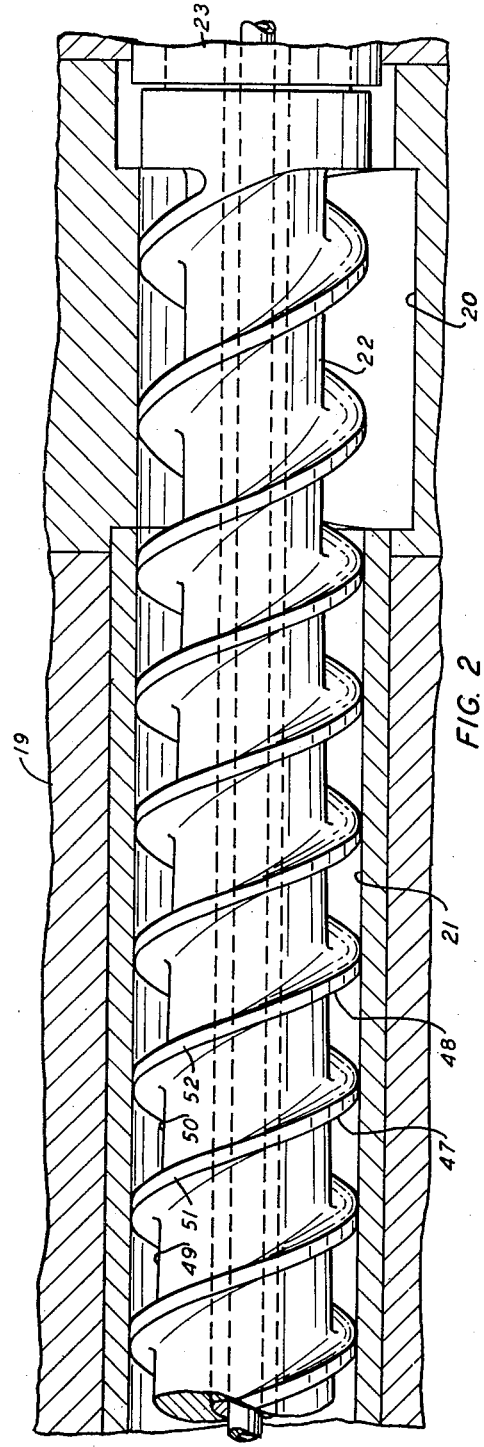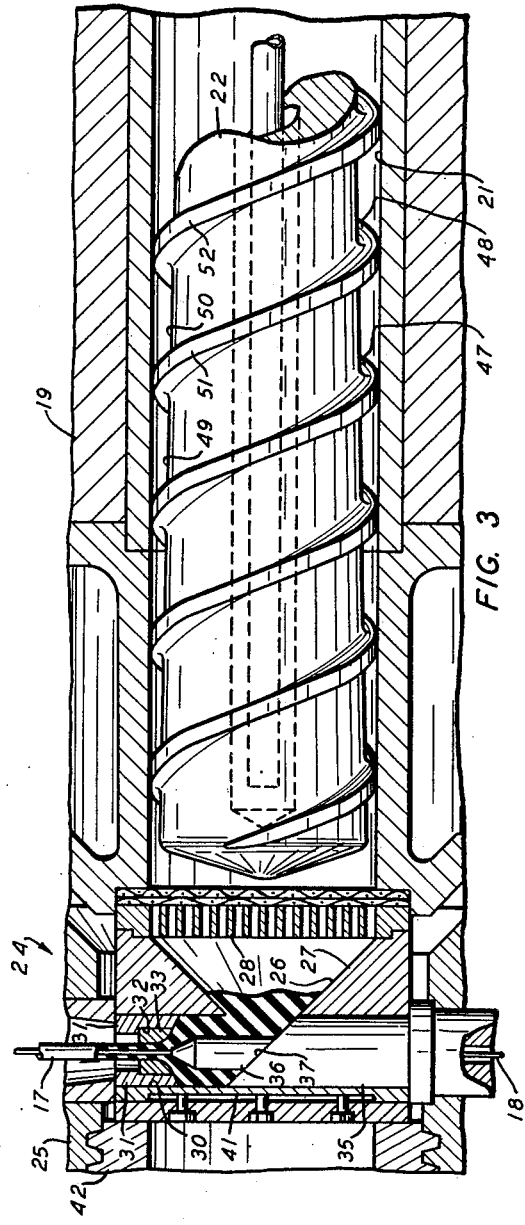

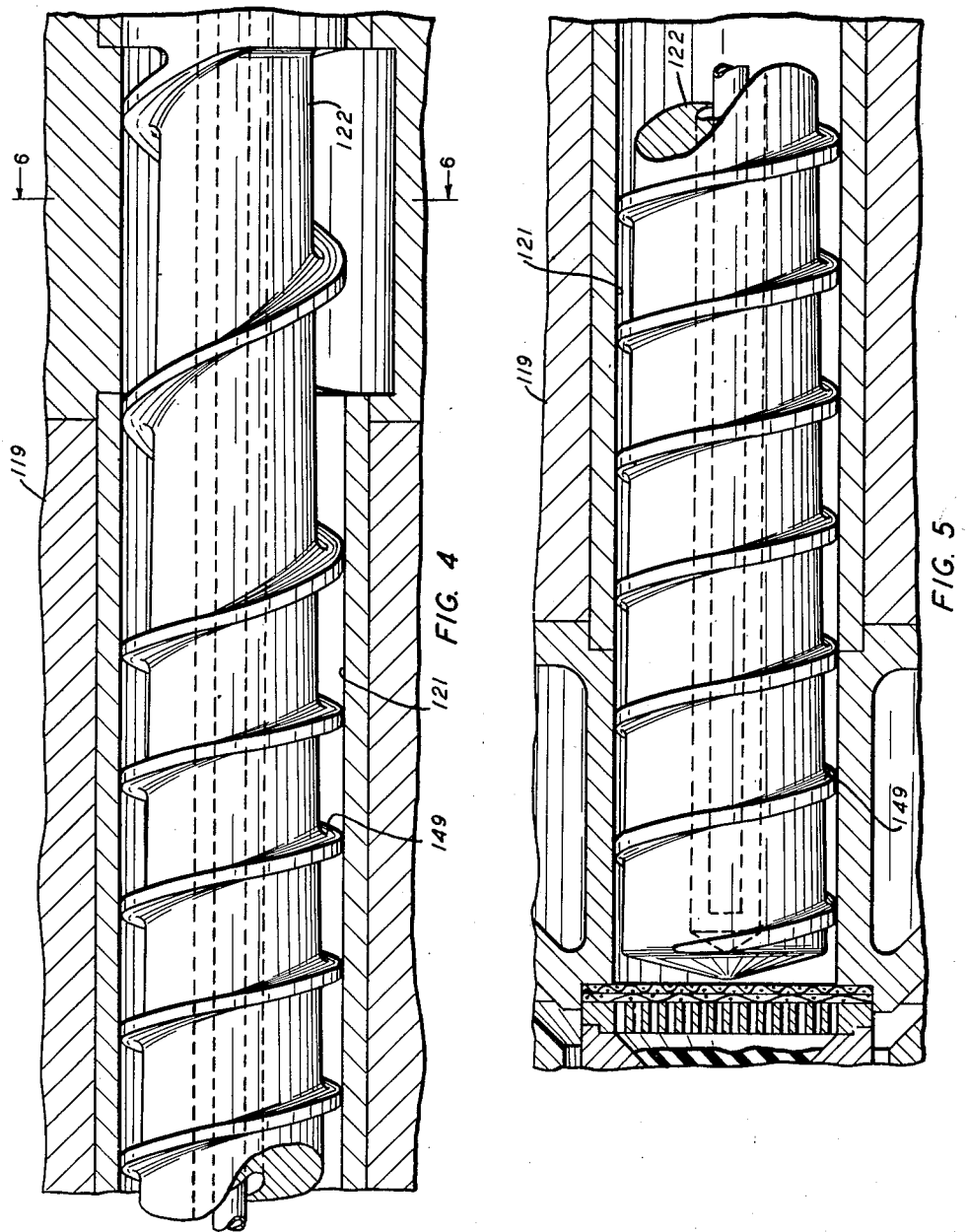

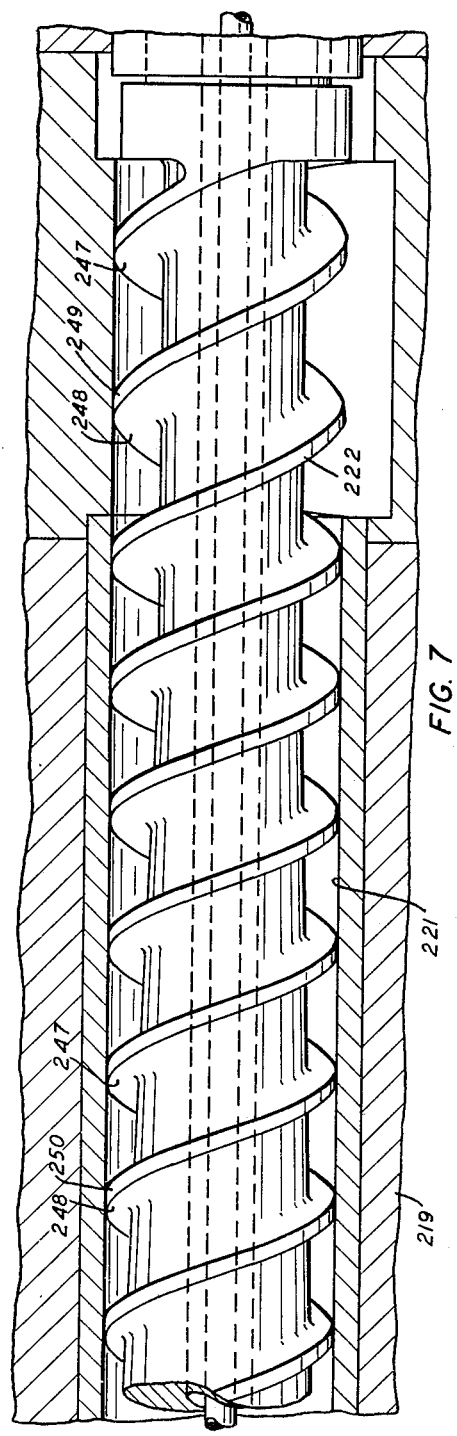
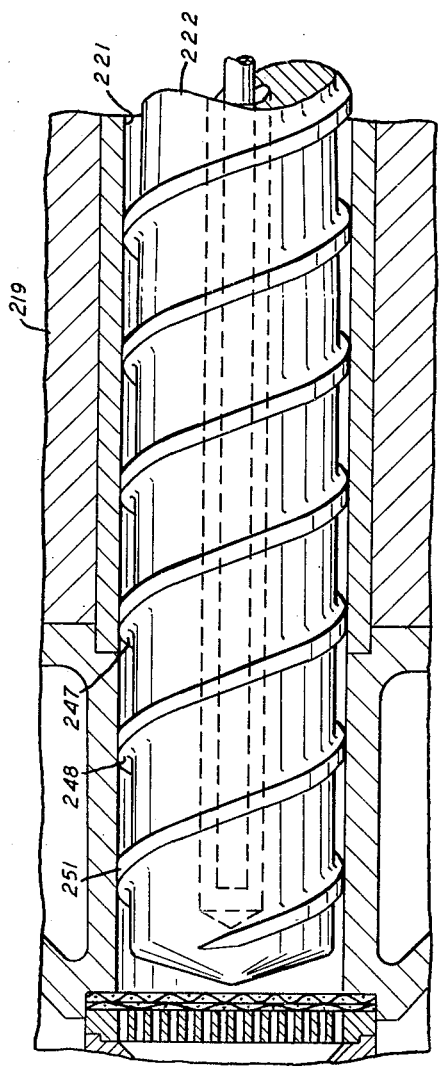

Patented Apr. 3, 1951

2,547,000

UNITED STATES PATENT OFFICE 2,547,000

APPARATUS FOR SIMULTANEOUSLY ADVANCING AND PLASTICIZING PLASTIC COMPOUNDS

Alvin N. Gray, Edgewood, Md., assignor to Western Electric Company, Incorporated, New York, N. Y., a corporation of New York Application April 7, 1949, Serial No. 86,062

8 Claims. (Cl. 18—12)

This invention relates to apparatus for simultaneously advancing and plasticizing plastic compounds, and more particularly to screws for forcing plastic compounds through extrusion apparatus.

This application is a continuation-in-part of my copending application Serial No. 709,498, filed November 13, 1946, now abandoned, for "Apparatus for Simultaneously Advancing and Plasticizing Plastic Material."

Vulcanizable elastomer compounds often are used to insulate or jacket filamentary conductors. Rubber compounds, or compounds in which a vulcanizable, synthetic, rubber-like elastomer is the vulcanizable constituent may be used for this purpose. Among the synthetic elastomers most frequently employed are Buna S (a copolymer of butadiene and styrene) and neoprene (polymerized chloroprene). The elastomer compounds employed for such purposes cannot be extruded to form insulating or protective coverings on conductors without first being subjected to intensive working to reduce the elastomers present therein to a plastic, extrudable condition. This working is called "breaking down" the elastomer, and may be accomplished in a number of ways.

The ingredients of such an elastomer compound usually are mixed together in an internal mixer, which performs a part of the required breakdown, but further working is required to make the compound sufficiently plastic to extrude readily. The compound may be worked further by passing it through a strainer of known design, or by pelletizing it by means of conventional apparatus. Usually a final step before introducing such a compound into a wire-covering extruder or other final forming extruder is to mill it on mill rolls of known design. The latter step is almost invariably employed for the treatment of rubber and Buna S compounds, since the vulcanizer or vulcanization accelerator is added to the compound at that time. The addition of both the vulcanizer and accelerator prior to this milling step will result in at least partial vulcanization of the compound during its treatment in the Banbury mixer, or in the strainer or pelletizer.

The operations just described are expensive, and require considerable equipment and much handling of the compounds. In the past there has been no apparatus available which would reduce or minimize the mixing, milling and other working operations normally employed to render vulcanizable elastomer compounds extrudable.

Thermoplastic compounds frequently are employed to insulate or protect conductors and cable cores. Among the thermoplastic compounds most often used for this purpose are polyethylene, polymerized vinyl chloride, copolymers of vinyl chloride and vinyl acetate, and the like. These thermoplastic compounds usually are fed into an extruder in powder form or in the form of small granules, and are heated to a plastic state primarily by heat applied to the extruder through circulating fluids.

It is essential that such compounds be subjected to considerable working to compact the granules, to express air entrapped in the granules and to make the extruded compound homogeneous. The apparatus used heretofore to extrude coverings of thermoplastic materials upon conductors, cables, and the like, have failed to provide the working of such compounds necessary to achieve optimum results.

The compounds used to insulate or jacket wires and cables may vary all the way from a tough, highly resilient neoprene compound to a relatively soft, highly plasticized thermoplastic compound, such as a polyvinyl chloride compound. Such a neoprene compound requires extensive working to break it down to a state where it may be extruded into a suitable covering, and with extrusion apparatus hitherto known substantially all this working had to be done before the compound was introduced into the extruder. All the working needed to bring powdered or granular thermoplastic compounds into a plastic condition suitable for extrusion into satisfactory coverings has to be done in the extruder.

No apparatus used in this art in the past has been entirely suitable for handling either or both of these types of compounds. Thus, there is need for equipment of one general design that is capable of working, plasticizing and/or breaking down these widely diversified kinds of compounds.

An object of the invention is to provide new and improved apparatus for simultaneously forcing plastic compounds through extrusion apparatus and plasticizing it.

An apparatus illustrating certain features of the invention may include an extrusion cylinder having an elongated, imperforate bore therein, and an extrusion screw fitting closely within the bore and having a helical groove extending substantially from one end of the screw to the other end thereof, one end of the screw being a receiving end and the other end being a delivery end, said groove decreasing gradually in depth from the receiving end of the screw to the delivery end of the screw at which latter end the groove is sufficiently shallow to cause plastic compound advanced by the screw to be milled between the bottom of the groove and the wall of the bore so that the compound is worked intensely.

A complete understanding of the invention may be obtained from the following detailed description of apparatus forming specific embodiments thereof, when read in conjunction with the appended drawings in which:

Fig. 2 is a fragmentary, horizontal section taken along line 2—2 of Fig. 1;

Fig. 3 is a fragmentary, horizontal section taken along line 3—3 of Fig. 1;

Fig. 4 is a fragmentary, horizontal section of a portion of an apparatus forming an alternative embodiment of the invention;

Fig. 5 is a fragmentary, horizontal section of another portion of the apparatus shown in Fig. 4;

Fig. 7 is a fragmentary, horizontal section of a portion of an apparatus forming a third embodiment of the invention, and Fig. 8 is a fragmentary, horizontal section of another portion of the apparatus shown in Fig. 6.

Apparatus embodying the invention may be used to apply coverings of plastic compounds upon filamentary materials of indefinite length, such as wire-like conductors and cable cores used for communication purposes. For covering a particular conductor or core for a given use, the plastic compound from which the covering is formed may be a vulcanizable compound including rubber or a synthetic rubber-like material, such as Buna S, neoprene, or the like. The compound may be one consisting principally of a thermoplastic material, such as polyethylene, a polyvinyl resin, or the like.

Figure 1:
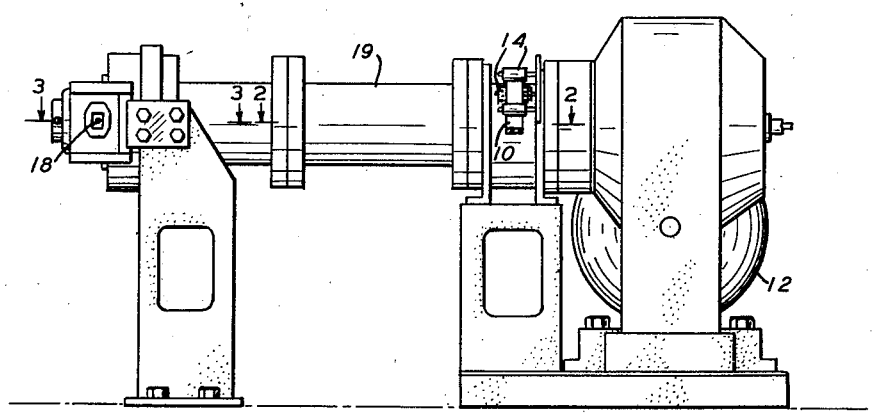
Fig. 1 is a fragmentary, side elevation of an apparatus forming one embodiment of the invention.

Referring now in detail to the drawings, a strip 10 (Fig. 1) of a vulcanizable compound is fed into the entrance end of an extrusion apparatus powered by an electric motor 12 over feed rolls 14—14, and the apparatus forms a covering 17 of the vulcanizable elastomer compound, such as a rubber compound, a Buna S compound, a neoprene compound, or the like, of which the strip 10 is composed, around a filamentary conductor 18, which may be bare or may have a textile, or other, covering thereon. The extrusion apparatus includes a jacketed extrusion cylinder 19, through which may be circulated a suitable heat exchange fluid to cool the vulcanizable elastomeric compound employed. The extrusion cylinder 19 has a charging opening 20 and cylindrical bore 21 formed therein in which a hollow stock screw 22 driven by the motor 12 is rotatably mounted. The stock screw 22 may be cooled when used to extrude vulcanizable compounds by circulating a suitable heat exchange fluid in the central bore thereof.

The stock screw 22 is rotated by a shaft 23 to force the compound under a high pressure through the bore 21, a strainer 28 and an extruding head 24. The extruding head includes a body member 25 and a tool holder 27 having a tapered opening 26, which forms a continuation of the bore 21 and communicates with a bore 30 formed in the tool holder transversely of the tapered opening 26. An annular die holder 31 positioned in the exit end of the bore 30 has counterbore 32 formed therein in which is mounted a forming die 33.

The conductor 18 is advanced upwardly as viewed in Fig. 2, by a suitable conductor-advancing means, such as a capstan (not shown), through a core tube holder 35 and a core tube 36, which is held in the exit end of the core tube holder 35. The core tube holder is provided with an inclined concave surface 37 for deflecting the plastic compound toward the die 33. An aligning plate 41 maintains the die holder 31 and the core tube holder 35, and thereby the die 33 and the core tube 36, centered relative to each other in the bore 30, and a retaining nut 42 holds the tool holder 27 in the extruding head 24.

The stock screw 22 includes grooves 47 and 48 of generally rectangular cross-section formed by roots 49 and 50 and threads 51 and 52 extending outwardly from the roots 49 and 50. The bore 21 is smooth-walled, as a substantially uniform diameter along its entire length, and encloses the stock screw 22 from an entrance end portion thereof at the right hand end of the screw 22, as viewed in Fig. 2, to a delivery end portion thereof, which is at the left hand end of the screw, as viewed in Fig. 3. The external diameters and pitches of the threads 51 and 52 are identical and are constant throughout the length of the screw 22 from a point just beyond the entrance portion of the screw to the delivery end thereof. However, if desired, the pitch of each of these threads may be made so that it decreases slightly from the portion of the screw adjacent to the receiving end of the bore 21 to the delivery end thereof. The leading faces of the threads 51 and 52 are substantially perpendicular to the roots 49 and 50 of the screw so that good delivery action is provided.

The grooves 47 and 48 vary gradually from a large depth at the entrance portion of the screw to a shallow depth at the delivery portion of the screw. Thus, the cross-sectional areas of the passages formed by the grooves 47 and 48 and the wall of the bore 21 decrease gradually from quite large cross-sectional areas at the entrance portions of the grooves to quite small cross-sectional areas at the delivery portions thereof. Conversely, the grooves 47 and 48 are relatively deep at the entrance portions thereof, and are quite shallow at the delivery portions thereof.

*Operation*

In the operation of the apparatus described hereinabove, the extrusion screw 22 is rotated in the extrusion bore 21 by the shaft 23. The vulcanizable compound to be extruded is introduced at room temperature into the bore 11 through the charging opening 20, and the threads 41 and 42 of the screw force the compound toward the delivery end of the screw. The screw 22 is constantly filled at the entrance portion of the bore 21 and forces the compound constantly toward the delivery end of the screw, which works and mixes the compound and makes it more plastic. As the compound progresses toward the left, as viewed in Figs. 2 and 3, the grooves 47 and 48 get constantly shallower. As a result, the mass of compound is reduced more and more in cross-section as it is forced along the extrusion screw, and is rubbed between the wall of the bore 21 and the roots 49 and 50 to provide a shearing and working action.

This shearing and working action remains high as the compound is forced in ribbon-like form along the bore 21 to the delivery end of the stock screw 22, even though the compound becomes progressively more plastic, and, hence, less responsive to working, because the grooves 47 and 48 are much shallower at the delivery end of the stock screw than at the entrance end thereof. The gradual decrease in the depths of the grooves 47 and 48 is proportional to the progressive increase in plasticity of the compound being worked, so that the intensity of the working action matches the plasticity of the compound as it is advanced along the bore and the accumulated plasticizing effect is high.

This type of screw is especially effective for breaking down vulcanizable elastomer compounds that have not been subjected to sufficient working prior to their introduction into the extruder to permit them to be extruded properly with an extruder equipped with other types of screws heretofore known. Thus, such a screw may be used to work, break down and plasticize tough, relatively unworked neoprene compounds, as well as more highly worked or plasticized compounds containing neoprene, rubber or Buna S. There is no danger of burning the compound when extruding vulcanizable compounds due to excess working during the process because the compound is being reduced in thickness constantly, thus aiding the heat transfer from the body of the compound to the cooled screw and cylinder.

In the use of the term "highly accelerated" with reference to vulcanizable compounds in the specification and claims, it is intended to designate compounds which will substantially completely cure within one minute when in a generally annular form 0.050 inches in wall-thickness and subjected exteriorly to steam under a pressure of about 250 pounds per square inch, or conditions equivalent thereto.

In the use of the terms "vulcanizable compound," "elastomer compound," or forms thereof, it is intended to embrace compounds containing materials, such as neoprene, which are not cured by the action of sulfur as well as materials that are vulcanized by sulfur. Typical elastomers that are vulcanized when subjected to heat and pressure in the presence of sulfur are rubber and Buna S. While neoprene is not vulcanized under these conditions, neoprene compounds containing a suitable reagent, such as zinc oxide, when subjected to heat and pressure, are converted irreversibly into a form resembling that of vulcanized rubber. Thus, this action resembles that which occurs in the vulcanization of rubber, and the term "vulcanizable" is applied herein and in the annexed claims to neoprene compounds in addition to compounds that undergo true vulcanization, such as rubber and Buna S compounds.

The depth of the entrance portions of the grooves 47 and 48 should be at least four times that of the delivery end thereof to obtain the best working and consolidating action regardless of the type of material treated. The radial clearance between the portion of the roots 49 and 50 at the delivery end of the screw and the wall of the bore 21 should fall within a critical range having a lower limit of just enough over 0.0 inch to provide delivery of the compound being worked upon and having an upper limit approaching 0.03 inch, depending upon the kind of material treated and the amount of working to be imperative thereto. The external surfaces of the threads 51 and 52 are in rubbing contact with the bore 21 from the entrance portion to the delivery portion of the screw 22.

When a screw of this design is used to work a vulcanizable elastomer compound, this clearance preferably is just sufficient to provide delivery of the compound and yet to work the compound intensely. Thus, for a very tough, relatively unworked neoprene compound, this clearance would be about 0.015 inch in order to provide the break down necessary to cause such a compound to be sufficiently plastic to be extruded into a satisfactory covering. Since this clearance is sufficient to break down such a highly difficult compound, it obviously would provide effective working on more tractile vulcanizable compounds. However, for certain other compounds that do not require such intensive working as do tough neoprene compounds, such as a previously worked or milled rubber compound, a clearance more nearly approaching 0.030 inch may be more desirable and will provide greater delivery.

For extruding vulcanizable elastomer compounds, the threads of the stock screw 22 should have a helix angle, measured as the angle between the threads and a plane perpendicular to the longitudinal axis of the screw, between about 18° and about 30°.

Highly satisfactory results have been obtained, when working and extruding vulcanizable elastomeric compounds, by using a double threaded screw 18 inches long in which the clearance between the roots 49 and 50 and the wall of the bore 21 at the entrance end of the cylinder 19 just beyond the charging opening was about 0.688 inch, the clearance between the roots and the bore at the delivery end of the screw was about 0.015 inch, the diameter of the bore was about 3.25 inches, the width of the grooves was about 1.5 inches, and the helix angle of the threads was about 24°.

*Modification No. 1 (Figs. 4, 5 and 6)*

Figure 6:
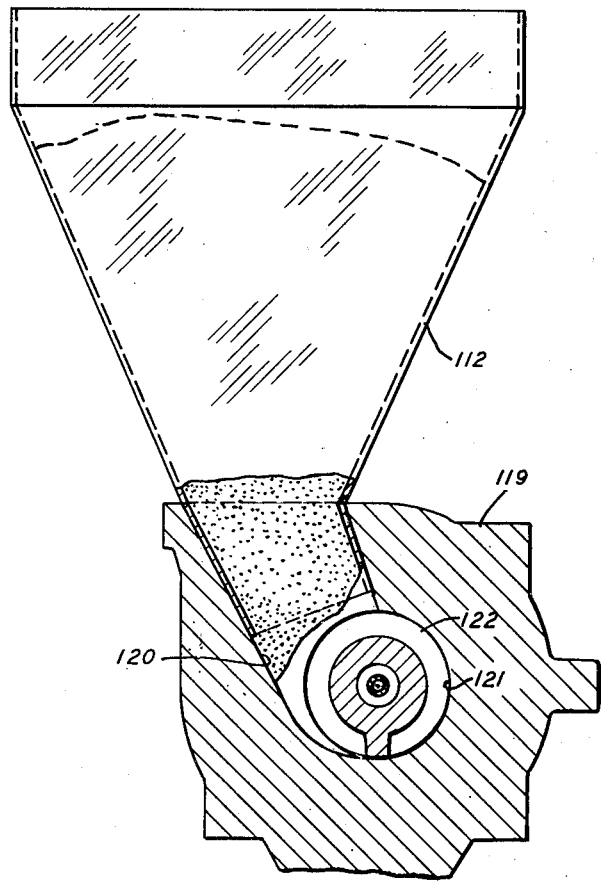
Fig. 6 is a vertical section taken along line 6—6 of Fig. 4.

The apparatus disclosed in Figs. 4, 5 and 6 is designed primarily to mix, plasticize and fuse thermoplastic compounds, such as, polyethylene compounds, polymeric vinyl chloride compounds and copolymeric vinyl chloride-vinyl acetate compounds. This apparatus is substantially identical with that shown in Figs. 1 to 3, except that it is provided with a hollow stock screw 122 (Figs. 4 and 5) which differs somewhat from the stock screw 22 (Fig. 2). The apparatus includes an extrusion cylinder 119 having a charging opening 120 and a cylindrical bore 121, in which the screw 122 rotates, and a hopper 112 supplies the ingredients of the compound to the cylinder.

At the portion thereof beyond the charging opening 110, the screw 122 is provided with a single groove 149 having a helix angle of from about 9° to about 30° measured as the angle between the groove and a plane perpendicular to the longitudinal axis of the screw. The depth of the groove decreases from the right hand end thereof, as viewed in Fig. 4, which is the entrance end of the apparatus, to the left hand end thereof, as viewed in Fig. 5, which is the delivery end thereof, the graduation in depth being such as to match the working intensity with the plasticity of the compound.

For working, mixing and extruding thermoplastic compounds, the clearance between the bottom of the groove and the wall of the bore 121 in the cylinder 119 should be between the range of from slightly above 0.0 inch to about 0.020 inch. A clearance of about 0.01 inch will provide ample working and plasticizing of thermoplastic compounds of the type used for insulating and protecting coverings on wires and cables. The radial clearance between the wall of the bore and the bottom of the groove 149 at the entrance end of the screw should be at least four times that at the delivery end thereof. Apparatus for extruding thermoplastic compounds may employ a screw having the following dimensions: screw length 84.5 inches, 0.625 inch root clearance at the entrance end and 0.01 inch root clearance at the delivery end operating in an extrusion cylinder having a core 3.25 inches in diameter.

The hollow screw 122 and the jacketed cylinder 119 may be controlled as to temperature by suitable heated, heat exchange fluid circulated therethrough to aid in plasticizing the thermoplastic compound.

Operation of modification No. 1

The ingredients of thermoplastic compounds may be introduced through the hopper 112 into the cylinder 119 in unmixed condition or in premixed powdered or granular condition. The screw 122 conveys the compound along the bore 121 with a working, mixing and consolidating action. The heated stock screw 122 and cylinder 119 serve to heat the thermoplastic compound as it is moved away from the entrance portion of the apparatus to aid in plasticizing the compound. However, if the compound should be raised by the working thereof to a temperature above that of the screw 122 and cylinder 119, these elements cool the compound to keep it below a charring temperature. The thermoplastic compound is thoroughly plasticized and mixed, and is in a state of thermal homogeneity as it leaves the cylinder 119 so that it may be extruded into a smooth, uniform covering.

Modification No. 2 (Figs. 7 and 8)

The apparatus shown in Figs. 7 and 8 is generally identical with the two forms of apparatus described hereinabove, except that a hollow stock screw 222 differs somewhat from the stock screws 22 and 122. The stock screw 222 rotates in a bore 221, and has grooves 247 and 248, which are deep and of uniform depth along an entrance portion 249 of the screw, vary from deep to shallow along an intermediate portion 250 of the screw, and are shallow along a delivery portion 251 of the screw. The entrance portion of the screw 222 takes in compound rapidly, the portion of the screw along which the intermediate portions of the grooves extend consolidates, works and compacts the compound with progressively increasing intensity, and the delivery portion of the screw mixes and works the compound with high intensity as it is advanced therealong.

Since the delivery portions of the grooves 247 and 248 are much shallower than the entrance portions thereof and extend substantial distances along the screw, these delivery portions exert a throttling action on the flow of the compound so that the compound does not leave the screw until the compound is thoroughly worked. The compound is intensively worked and mixed along the entire length of the portion of the screw along which the delivery portions of the grooves extend by an intensive milling action between the bottoms of these portions of the grooves and the wall of the bore 221. Thus, the extrudability of the compound is high as it leaves the cylinder 219 just prior to extrusion thereof.

The above-described types of apparatus mill the compounds at the portions of the screws near the delivery ends thereof. The milling action thoroughly heats, mixes and plasticizes, and, if necessary breaks down, the compounds as they are forced through the bores 21, 121 and 221. Hence, pre-extrusion working operations on elastomer compounds, which were formerly required before the compounds could be extruded by extrusion apparatus, may be minimized with the methods and apparatus described hereinabove. Furthermore, the above-described methods and apparatus serve to completely fuse particles of thermoplastic material so that initially powdered or granulated thermoplastic material may be extruded successfully. The above-described method and apparatus also may be used to mix previously unmixed ingredients of the thermoplastic compound together and extrude the compound in the form of a finished product in a single operation. This method and apparatus also serve to plasticize highly accelerated vulcanizable compounds to a state of thermal and physical homogeneity so that the compounds may be forced through the strainer 28 and the strainers corresponding thereto, without clogging the strainer and without setting up of the compuonds in the apparatus.

Heat control of compounds advanced along the screws 22, 122 and 222 is excellent since the compounds, which, in the case of both thermosetting compounds and thermoplastic compounds, are low in heat conductivity, are in thin, ribbon-like form presenting a large surface area to the jacketed cylinder and the hollow screw. Thus, the temperatures of the compounds may be regulated as desired.

The flow of the compounds from their introduction into the cylinders 19 and 119 to the delivery ends of the stock screws 22 and 122 are throttled with progressively increasing intensity so that the compounds are placed under progressively higher pressures and are progressively consolidated as they flow. This throttling, particularly at the delivery ends of the screws, prevents pulsations in rates of delivery of the compounds, and insures that each compound is thoroughly plasticized regardless of the rate at which the compound is extruded. Hence, any variations in rate of delivery of the compound are eliminated by the time the compound reaches the extruding head, and the covering is formed with an unvarying wall thickness.

What is claimed is:

1. An extruder, which comprises an extrusion cylinder having an elongated, imperforate bore therein, and an extrusion screw fitting closely within the bore and having a helical groove extending from substantially one end of the screw to the other end thereof, one end of the screw being a receiving end and the other end being a delivery end, said groove decreasing gradually in depth from the receiving end portion of the screw toward the delivery end portion of the screw at which latter end the groove is sufficiently shallow to cause plastic material advanced by the screw to be milled between the bottom of the groove and the wall of the bore so that the material is worked intensely, the depth of the portion of the groove at the delivery end portion of the screw being between about 0.0 inch and about 0.030 inch.

2. An extruder for thermoplastic compounds, which comprises an extrusion cylinder having an elongated, imperforate bore therein, and an extrusion screw fitting closely within the bore and having a helical groove extending from substantially one end of the screw to the other end thereof, one end of the screw being a receiving end and the other end being a delivery end, said groove decreasing gradually in depth from the receiving end portion of the screw toward the delivery end portion of the screw at which latter end the groove is sufficiently shallow to cause a thermoplastic compound advanced by the screw to be milled between the bottom of the groove and the wall of the bore so that the compound is worked intensely, the depth of the portion of the groove at the delivery end portion of the screw being between about 0.0 inch and about 0.020 inch.

3. An extruder for thermoplastic compounds, which comprises an extrusion cylinder having an elongated, imperforate bore therein, and an extrusion screw fitting closely within the bore and having a helical groove extending from substantially one end of the screw to the other end thereof, one end of the screw being a receiving end and the other end being a delivery end, said groove decreasing gradually in depth from the receiving end portion of the screw toward the delivery end portion of the screw at which latter end the groove is sufficiently shallow to cause a thermoplastic compound advanced by the screw to be milled between the bottom of the groove and the wall of the bore so that the compound is worked intensely, the depth of the portion of the groove at the delivery end portion of the screw being about 0.010 inch.

4. An extruder for elastomer compounds, which comprises an extrusion cylinder having an elongated, imperforate bore therein, and an extrusion screw fitting closely within the bore and having a helical groove extending from substantially one end of the screw to the other end thereof, one end of the screw being a receiving end and the other end being a delivery end, said groove decreasing gradually in depth from the receiving end portion of the screw toward the delivery end portion of the screw at which latter end of the groove is sufficiently shallow to cause an elastomer compound advanced by the screw to be milled between the bottom of the groove and the wall of the bore so that the compound is worked intensely, the depth of the portion of the groove at the delivery end portion of the screw being between about 0.0 inch and about 0.030 inch.

5. An extruder, which comprises an extrusion cylinder having an elongated, imperforate bore therein, and an extrusion screw fitting closely within the bore and having a helical groove extending from substantially one end of the screw to the other end thereof, the helix angle of the groove being between about 9° and about 30°, one end of the screw being a receiving end and the other end being a delivery end, said groove decreasing gradually in depth from the receiving end portion of the screw toward the delivery end portion of the screw at which latter end the groove is sufficiently shallow to cause thermoplastic compound advanced by the screw to be milled between the bottom of the groove and the wall of the bore so that the material is worked intensely, the depth of the portion of the groove at the delivery end portion of the screw being about 0.010 inch.

6. An extruder for extruding thermoplastic compounds, which comprises an extrusion cylinder having an elongated, imperforate bore therein, and an extrusion screw fitting closely within the bore and having a helical groove extending from substantially one end of the screw to the other end thereof, the helix angle of the groove being between about 9° and about 30°, one end of the screw being a receiving end and the other end being a delivery end, said groove decreasing gradually in depth from the receiving end portion of the screw toward the delivery end portion of the screw at which latter end the groove is sufficiently shallow to cause a thermoplastic compound advanced by the screw to be milled between the bottom of the groove and the wall of the bore so that the compound is worked intensely, the depth of the portion of the groove at the delivery end portion of the screw being about 0.010 inch.

7. An extruder for extruding thermoplastic compounds, which comprises an extrusion cylinder having an elongated, imperforate bore therein, and an extrusion screw fitting closely within the bore and having a helical groove extending from substantially one end of the screw to the other end thereof, the helix angle of the groove being between about 9° and about 30°, one end of the screw being a receiving end and the other end being a delivery end, said groove decreasing gradually in depth from the receiving end portion of the screw toward the delivery end portion of the screw at which latter end the groove is sufficiently shallow to cause a thermoplastic compound advanced by the screw to be milled between the bottom of the groove and the wall of the bore so that the compound is worked intensely, the depth of the portion of the groove at the delivery end portion of the screw being about 0.010 inch.

8. An extruder for elastomer compounds, which comprises an extrusion cylinder having an elongated, imperforate bore therein, and an extrusion screw fitting closely within the bore and having a pair of equidistant helical grooves extending from substantially one end of the screw to the other end thereof, the grooves having a helix angle between about 18° and about 30°, one end of the screw being a receiving end and the other end being a delivery end, said grooves decreasing gradually in depth from the receiving end portion of the screw toward the delivery end portion of the screw at which latter end of the grooves are sufficiently shallow to cause an elastomer compound advanced by the screw to be milled between the bottom of the groove and the wall of the bore so that the compound is worked intensely, the depth of the portions of the grooves at the delivery end portion of the screw being about 0.0 inch and about 0.030 inch.

ALVIN N. GRAY.

REFERENCES CITED

The following references are of record in the file of this patent:

UNITED STATES PATENTS

| Number | Name | Date |
| --- | --- | --- |
| 1,156,096 | Price | Oct. 12, 1915 |
| 1,904,884 | Royle | Apr. 18, 1933 |
| 2,384,521 | Anderson | Sept. 11, 1945 |
| 2,433,936 | Tornberg | Jan. 6, 1948 |
| 2,453,088 | Dulmage | Nov. 2, 1948 |